June 6, 1950    H. W. NEFF    2,510,649
ATMOSPHERIC PRESSURE PUMP
Filed April 23, 1948    2 Sheets-Sheet 2
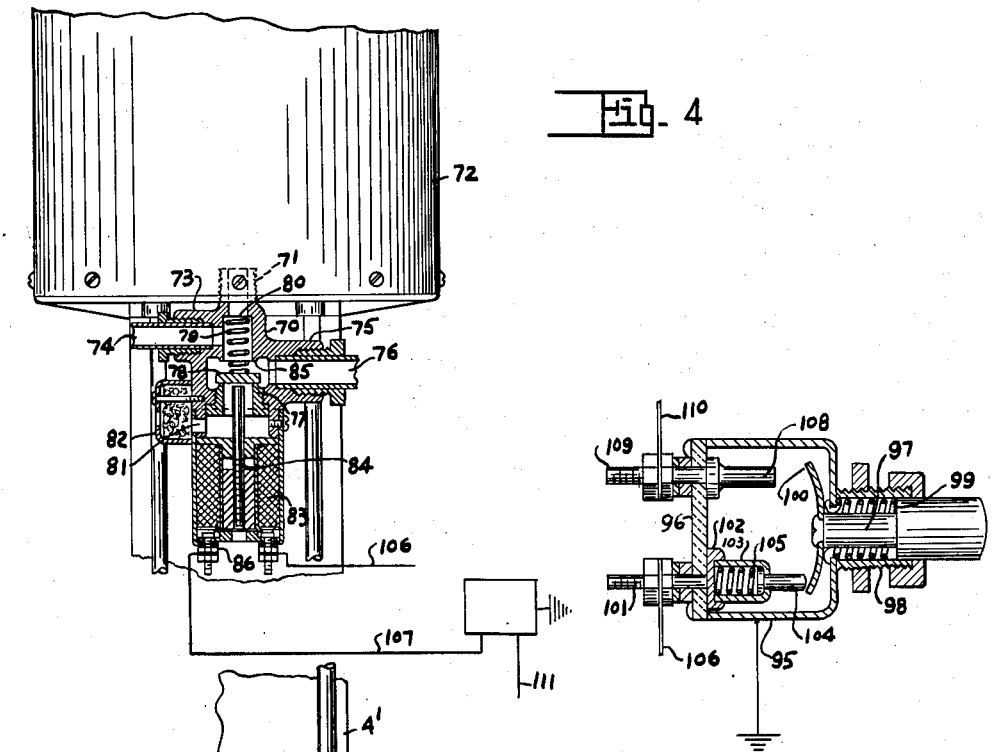
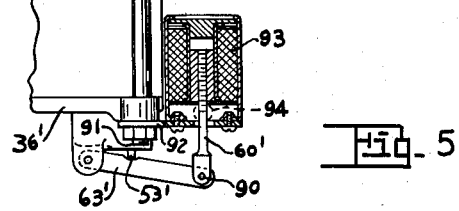
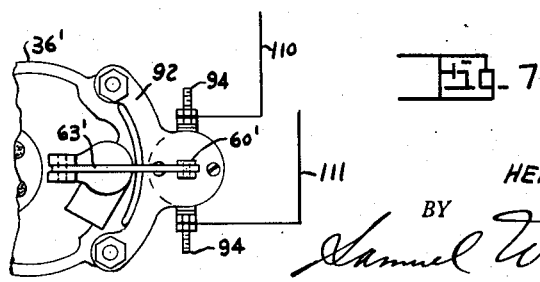
INVENTOR.
HENRY W. NEFF.
BY
Samuel Weisman
ATTORNEY.

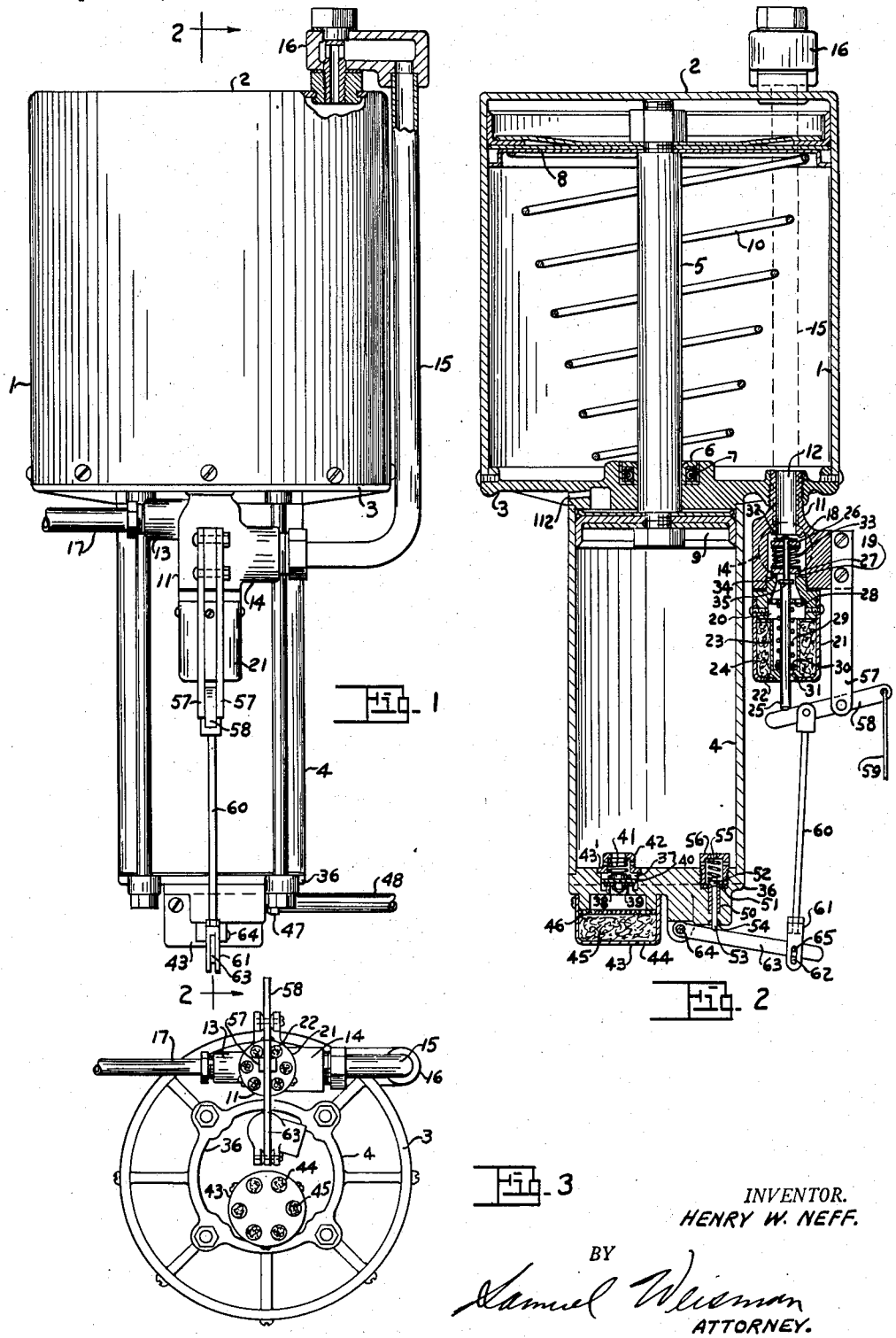

Patented June 6, 1950

2,510,649

UNITED STATES PATENT OFFICE 2,510,649

ATMOSPHERIC PRESSURE PUMP

Henry W. Neff, Detroit, Mich., assignor to Power Brake Parts Manufacturing Company, Detroit, Mich., a corporation of Michigan Application April 23, 1948, Serial No. 22,902

6 Claims. (Cl. 230—52)

The present invention pertains to a novel atmospheric pressure pump designed particularly for operating an air horn on a motor vehicle.

Ordinarily such a system requires a compressor for charging a tank from which the horn is operated at will. The system is subject to leakage, and the compressor automatically goes into operation when the pressure in the storage tank falls below an established minimum.

The general object of the invention is to provide a horn blowing apparatus that is free of such leakage and is idle or dormant at all times except when the horn is actually sounded. In other words in the present invention the problem of air leakage in a pressure system does not exist.

Another object of the invention is to do away with much of the drives, gearing and other parts associated with a compressor-storage tank system. These objects are accomplished generally by the use of an air-vacuum or atmospheric pressure pump in which an evacuated chamber is overbalanced by atmospheric pressure to displace a piston and drive a quantity of air into the horn for sounding it.

The pump includes a pair of alined cylinders sealed from each other with a common piston rod and a piston working in each cylinder. The so-called vacuum cylinder is permanently connected to the vacuum line at the side of the piston therein that will move the piston rod toward the outlet of the other cylinder which is known as the air cylinder. When the apparatus is idle, the vacuum line is also connected to the opposite side of the piston in the vacuum cylinder, and the pressure is overbalanced by a coil spring which retracts the piston rod from the outlet of the air cylinder.

When the horn is to be sounded, a valve is operated to cut off the second named vacuum connection to the vacuum cylinder and admit atmospheric air therein. Atmospheric pressure now moves the piston rod against the action of its spring and expels air from the air cylinder to the horn. The air outlet from the air cylinder is operated by the mechanism that actuates the valve but a delayed action is preferably produced in order to build up some pressure in the air cylinder before opening its outlet to the horn.

In one embodiment of the invention the valves are mechanically operated by linkage and levers. There are two valve members for controlling the vacuum and air connections, respectively, to the pressure side of the piston in the vacuum cylinder. Another object of the invention is to provide a valve mechanism that cuts off the vacuum line before the air port is opened, in order to avoid flow of air into the vacuum line, which is liable to interefer with the operation of the motor. The delayed action between this valve mechanism and the air cylinder of the valve is introduced by a suitable slip connection in the operating linkage.

In another embodiment of the invention, the valves are operated electrically by solenoids. In this case the valve action is so rapid that no damage occurs from flow of atmospheric air in the vacuum line. Consequently, a single valve member is sufficient for disconnecting the vacuum line and admitting atmospheric air to the pressure side of the piston in the air cylinder.

The invention is fully disclosed by way of example in the following description and in the accompanying drawings in which:

Figure 1 is a side elevation of the device;

Figure 2 is a section on the line 2—2 of Figure 1;

Figure 3 is a bottom plan view;

Figure 4 is a detail section of a modification, partly diagrammatic;

Figures 5 and 6 additional detail sections of the same modifications, and

Figure 7 is a bottom plan view of Figure 5.

Reference to these views will now be made by use of like characters which are employed to designate corresponding parts throughout.

The device includes a vacuum cylinder 1 having preferably an integral top 2 and an attached base 3 against which is mounted an air cylinder 4 externally of and coaxial with the cylinder 1. A piston rod 5 is mounted in the cylinder 1 and extends through the base 3 which carries a suitable seal 6 pressed against the rod by a surrounding coil spring 7. The rod 5 carries a piston 8 working in the cylinder 1 and a piston 9 working in the cylinder 4 and is of such length that the pistons may be disposed simultaneously at corresponding ends of their respective cylinders. A compressed coil spring 10 in the cylinder 1 bears against the base 3 and piston 8 to hold both pistons elevated until they are actuated against the spring by means that will presently be described.

A four-way fitting 11 is inserted in the base 3 to communicate with the cylinder 1 through a port 12. A lateral port 13 in the fitting is in constant communication with the cylinder 1 through the port 12 as shown in Figure 2. Another port 14 in the fitting is connected to the top of the cylinder 1 by a line 15 and a coupling 16. A vacuum line 17 from the motor is connected into the port 13 to constantly exhaust the cylinder 1 beneath the piston 8 through the port 12 and to exhaust the cylinder above the piston 8 in a controlled manner through the line 15 as will presently be described.

Between the ports 13 and 14, the interior of the fitting 11 is formed with a downwardly facing valve seat 18 and is also formed beneath the port 14 with another downwardly facing valve seat 19. The fitting 11 has an open lower end 20 to which is attached an air cleaner. This device includes a shell 21 having perforations 22 in the bottom and containing a hollow core 23 with horsehair or another suitable medium 24 stuffed between the shell 21 and the core 23. A valve stem 25 extends through the core and into the fitting and is equipped with slidable valve pins 26, 27 adapted to cooperate with the seats 18 and 19 respectively. A perforated retainer disk 28 is seated in the open end 20 of the fitting, and the valve stem 25 is surrounded by a compressed coil spring 29 which bears against the retainer 28 and against a collar 30 on the valve stem, the collar stopping against the lower end 31 of the core 23.

The upper end of the valve stem carries a collar 32 that bears upon the valve 26. A compressed coil spring 33 is inserted between the valve pins 26, 27, causing the latter to rest normally upon a seat or shoulder 34 formed in the fitting 11. At some distance below the shoulder 34, in the idle position shown in Figure 2, the valve stem 25 is formed with a collar 35. The tension of the spring 29 against the collar 30 is such as to hold the valve head 26 spaced from its seat 18, so that normally both sides of the piston 8 are under equal air pressure and the piston is elevated by the spring 10.

The lower end of the air cylinder 4 is covered by a base 36, which has an opening 37 therethrough for admitting atmospheric air into the cylinder. The opening is controlled by an outwardly opening check valve which will now be described. Near the bottom of the opening is formed a seat 38 on which is mounted a valve disk 39. Upon the disk is laid a metal plate 40 of non-circular shape so that air can flow around its edges. A coil spring 41 is laid upon the member 40 and is covered by a perforated cap 42 having a flange piece 43' that is prick punched against the base 36. Below the opening 37 is attached an air cleaner comprised of a shell 43 having bottom perforations 44 and filled with horsehair or another medium 45 covered by a screen 46.

The base 36 is formed with a lateral port 47 into which is inserted a line 48 leading to the air horn. A hole 50 is drilled through the base 36 and across the port 47. A valve seat member 51 is mounted around the hole 50 above the port 47 and is engaged by a valve head 52 from which a valve stem 53 extends through the bottom of the base where it is sealed at 54. A coil spring 55 bears upon the valve head 52 and is pressed by a perforated cap 56 screwed into the top of the base.

A suitable bracket 57 is suspended from the fitting 11 and has a rocker arm 58 pivoted to its lower end. One end of the rocker arm engages the lower end of the valve stem 25, and the other end is attached to an operating wire 59 or similar device which extends to the operator's station.

A link 60 is suspended from the rocker arm 58 between the pivot point and the valve stem 25. The lower end of the link 60 carries a slip coupling 61 formed with a slot 62. A lever 63 is pivoted at 64 to the base 36, passing beneath the valve stem 53 and has its other end loosely connected to the coupling 61 by means of a pin 65 extending into the slot 62.

In the operation of the device, the parts are normally in the position shown in Figure 2. When the operator wishes to blow the air horn, he pulls on the wire 59 and thereby lifts the valve stem 25. The initial movement of the valve stem permits the valve head 26 to close against the seat 18, thereby closing the vacuum line 17 from the line 15 and the top of the cylinder while maintaining communication with the cylinder beneath the piston 8. The continued movement of the valve stem 25 and its collar 35 raises the valve head 27 and opens the air strainer 21—24 to the port 14, line 15 and top of the piston 8.

Atmospheric pressure upon the piston 8 moves the piston rod 5 downward against the spring 10 and the reduced pressure beneath the piston 8. The downward movement of the piston 9 in the cylinder 4 compresses air that was drawn into the cylinder through the check valve 37—43 on the previous upstroke of the piston 9. Some compression occurs in the cylinder 4 before its outlet valve 52 is opened. The movement of the rocker arm 58 and link 60 has been inoperative on the lever 63 by reason of the slot and pin connection 62, 65. The final movement of the rocker arm and link swings the lever 63 against the valve stem 53 to lift the valve 52 from its seat 51 and admit compressed air from the cylinder 4 into the port 50 and the line 48 leading to the air horn.

The horn will continue to blow until the piston 9 reaches the bottom of the cylinder 4. The operator then releases the wire 59, and the spring 10 quickly returns the parts to their initial position, so that another operation of the horn if desired is immediately available. The retraction of the piston 9 has drawn air into the cylinder 4 through the check valve for the next operation.

In the modification shown in Figures 4 to 7, solenoids and a switch are substituted for the operating linkage. The vacuum control valve is of somewhat different design and includes a fitting 70 having a ported end 71 threaded through the bottom of the vacuum cylinder 72 to communicate therewith. The fitting has a lateral vacuum port 73 into which is connected the vacuum line 74 from the motor. The line 74 is in constant communication with the cylinder 72 through the port 71. There is another lateral port 75 in valved communication with the port 71 and connected by a line 76 to the top of the cylinder 72.

A valve seat 77 is provided in the fitting 70 adjacent to the port 75 and below the port 73. A valve disk 78 is held upon the seat 77 by a coil spring 79 bearing against a shoulder 80 in the ported end 71. The fitting has a lateral air port 81 below the seat 77, and an air cleaner 82 is secured against the port 81.

A solenoid 83 is suspended from the fitting 70 and has an armature 84 in the form of a sliding rod adapted to move the valve 78 off its seat 77 and against an upper seat 85 so that atmospheric air will not flow into the bottom of the cylinder 72. This movement of the valve 78 is very rapid, and this mechanism requires no counterpart of the delayed action of the air admitting valve 27 of Figure 2. Binding posts 86 connected to the winding of the solenoid are adapted for wiring to a switch circuit as will presently be shown.

The valves on the air cylinder 4' are unchanged, but the link 60 is replaced by a rod 60' connected to the lever 63' for operating the valve stem 53' by a simple pivot 90. The bolts 91 for attaching the bottom 36' of the cylinder 4' carry a laterally extending bracket 92. This bracket supports a solenoid 93 which contains the upper end of the rod 60' as its armature. Binding posts 94 connected to the winding of the solenoid are adapted for wiring to the previously mentioned operating switch.

The operating switch is shown in Figure 6 and includes a housing 95 grounded to the chassis of the vehicle and having an insulated end wall 96. In the opposite wall is slidably mounted a push rod 97 guided in a nipple 98 and held outward by a coil spring 99. The rod 97 carries a head 100 within the casing 95 for a purpose that will presently be described.

The wall 96 carries an external binding post 101 with an internal head 102 which is flanged or peened to hold a sleeve 103. In the sleeve is slidably mounted a contact finger 104 engageable by the head 100 and backed by a coil spring 105. A conductor 106 extends from the post 101 to one of the posts 86, and the other post 86 is grounded by a conductor 107. When the head 100 comes into engagement with the finger 104, the latter becomes grounded through the casing 95. There is established through the solenoid 83 a circuit grounded at both ends, and it will be understood that the conductor 107 may be grounded through the battery. The valve 70—80 and the pistons within the cylinders now operate in the manner already indicated. However, the air valve to the horn has not yet been opened.

The movement of the push rod 97 is continued with a telescopic action of the contact members 103, 104 until the head 100 engages another contact 108 mounted in the insulated wall 96. An external binding post 109 is formed as an integral part of the contact 108 and is wired at 110 to one of the posts 94 of the solenoid 93. The remaining post 94 is grounded, preferably through the battery, by a conductor 111.

When the contact 108 is engaged by the head 100, the solenoid 93 is energized to lift the rod 60' and swing the lever 63' against the valve stem 53' to admit compressed air to the horn. The time interval between the engagements of the contacts 104 and 108 by the head 100 permits some compression in the air cylinder before the latter is opened to the horn, as in the construction shown in Figures 1 to 3. Thus, the initial sounding of the horn has sufficient intensity. The electrically controlled system will operate the horn as long as the head 100 engages both contacts 104 and 108 until the air cylinder is evacuated. When the sounding ceases, the rod 97 should be released, and the spring in the vacuum cylinder will perform a rapid charging of the air cylinder, as previously set forth. In either construction, on the pressure stroke of the piston in the air cylinder, atmospheric air is admitted above the piston by a suitable port 112 in the bottom piece 3.

It is now apparent that the apparatus, as distinguished from a compressor-tank system, is dormant except when actually operated. Consequently there is less wear of the parts and less danger of failure. The apparatus does not require a storage of compressed air, there is no problem of leakage and no possibility of failures resulting from leakage.

It will be noted that, in addition to the absence of a compressor and storage tank, there is no mechanical driving means such as belts, gears and the like. There is also a minimum of piping and fittings. The only necessary piping connections are one from the engine manifold to the vacuum control valve and another from the air cylinder outlet to the horn.

Although specific embodiments of the invention have been illustrated and described, it will be understood that various alterations in the details of construction may be made without departing from the scope of the invention as indicated by the appended claims.

What I claim is:

1. An atmospheric pressure pump comprising a vacuum cylinder, an air cylinder in alinement therewith and sealed therefrom, a piston rod common to said cylinders, pistons on said rod and working respectively in said cylinders, a vacuum line connection to said vacuum cylinder beneath the piston therein, a valve fitting communicating with said connection, a line from said fitting to said vacuum cylinder above the piston therein, an air inlet to said fitting and adapted to communicate with said line, valve means for opening said line to said inlet and closing said line to said vacuum connection, a check-valved inlet to said air cylinder, a compressed air outlet from said air cylinder, a normally closed valve in said outlet, and a single means for successively shifting said valve means and said valve, whereby to delay the action of the latter.

2. An atmospheric pressure pump comprising a vacuum cylinder, an air cylinder in alinement therewith and sealed therefrom, a piston rod common to said cylinders, pistons on said rod and working respectively in said cylinders, a vacuum line connection to said vacuum cylinder beneath the piston therein, a valve fitting communicating with said connection, a line from said fitting to said vacuum cylinder above the piston therein, an air inlet to said fitting and adapted to communicate with said line, a normally open valve between said connection and said line, a normally closed valve between said air inlet and said line, operating means for successively closing the first valve and opening the second valve, a check-valved inlet to said air cylinder, a compressed air outlet from said air cylinder, a normally closed valve in said outlet, means connected to and operable by the first means for opening the last named valve, and a delayed-action means in the connection between the first two means.

3. An atmospheric pressure pump comprising a vacuum cylinder, an air cylinder in alinement therewith and sealed therefrom, a piston rod common to said cylinders, pistons on said rod and working respectively in said cylinders, a vacuum line connection to said vacuum cylinder beneath the piston therein, a valve fitting communicating with said connection, a line from said fitting to said vacuum cylinder above the piston therein, an air inlet to said fitting and adapted to communicate with said line, a normally open valve between said connection and said line, a normally closed valve between said air inlet and said line, a stem slidable through both valves, and having a member bearing on the first valve, a spring acting on said stem to hold the first valve open, another spring between and bearing on both valves to hold the second valve closed, a collar on said stem adapted to engage and open the second valve and normally faced from the second valve, whereby on actuation of said stem the first valve closes before the second valve opens, a check-valved inlet to said air cylinder, a compressed air outlet from said air cylinder, a normally closed valve in said outlet, and a single means for successively sliding said stem and opening the last named valve, said means including a delayed-action device for opening the last named valve after the second valve.

4. An atmospheric pressure pump comprising a vacuum cylinder, an air cylinder in alinement therewith and sealed therefrom, a piston rod common to said cylinders, pistons on said rod and working respectively in said cylinders, a vacuum line connection to said vacuum cylinder beneath the piston therein, a valve fitting communicating with said connection, a line from said fitting to said vacuum cylinder above the piston therein, an air inlet to said fitting and adapted to communicate with said line, valve means for opening said line to said inlet and closing said line to said vacuum connection, a check-valved inlet for said air cylinder, a compressed air outlet from said cylinder, a normally closed valve in said outlet, electrical actuators for said valve means and said valves, and means for successively operating said actuators to shift said valve means before said valve.

5. An atmospheric pressure pump comprising a vacuum cylinder, an air cylinder in alinement therewith and sealed therefrom, a piston rod common to said cylinders, pistons on said rod and working respectively in said cylinders, a vacuum line connection to said vacuum cylinder beneath the piston therein, a valve fitting communicating with said connection, a line from said fitting to said vacuum cylinder above the piston therein, an air inlet to said fitting and adapted to communicate with said line, valve means for opening said line to said inlet and closing said line to said vacuum connection, a check-valved inlet for said air cylinder, a compressed air outlet from said cylinder, a normally closed valve in said outlet, solenoids for actuating said valve means and said valve, and a progressively operating switch for successively energizing the solenoid for said valve means and the solenoid for said valve.

6. An atmospheric pressure pump comprising a vacuum cylinder, an air cylinder in alinement therewith and sealed therefrom, a piston rod common to said cylinders, pistons on said rod and working respectively in said cylinders, a vacuum line connection to said vacuum cylinder beneath the piston therein, a valve fitting communicating with said connection, a line from said fitting to said vacuum cylinder above the piston therein, an air inlet to said fitting and adapted to communicate with said line, valve means for opening said line to said inlet and closing said line to said vacuum connection, a check-valved inlet for said air cylinder, a compressed air outlet from said cylinder, a normally closed valve in said outlet, solenoids for actuating said valve means and said valve, terminals for the respective solenoids, and a circuit-making contact adapted to engage successively the terminal of the solenoid for said valve means and the terminal of the solenoid for said valve.

HENRY WM. NEFF.

REFERENCES CITED

The following references are of record in the file of this patent:

UNITED STATES PATENTS

| Number | Name | Date |
|---|---|---|
| 659,832 | Sipp | Oct. 16, 1900 |
| 884,131 | Compton | Apr. 7, 1908 |